(12) United States Patent
Segal (10) Patent No.: US 10,297,284 B2
(45) Date of Patent: May 21, 2019

(54) AUDIO/VISUAL SYNCHING SYSTEM AND METHOD

(71) Applicant: Touchcast LLC, New York, NY (US)

(72) Inventor: Edo Segal, New York, NY (US)

(73) Assignee: TOUCHCAST LLC, New York, NY (US)

( * ) Notice: Subject to any disclaimer, the term of this patent is extended or adjusted under 35 U.S.C. 154(b) by 0 days.

(21) Appl. No.: 16/192,691

(22) Filed: Nov. 15, 2018

(65) Prior Publication Data

US 2019/0088287 A1 Mar. 21, 2019

Related U.S. Application Data

(63) Continuation-in-part of application No. 16/181,617, filed on Nov. 6, 2018, which is a continuation of application No. 15/853,377, filed on Dec. 22, 2017, now Pat. No. 10,121,512, which is a continuation of application No. 15/608,932, filed on May 30, 2017, (Continued)

(51) Int. Cl.
*G11B 27/031* (2006.01)
*H04N 5/222* (2006.01)
*H04N 5/265* (2006.01)

(52) U.S. Cl.
CPC ........ *G11B 27/031* (2013.01); *H04N 5/2222* (2013.01); *H04N 5/2226* (2013.01); *H04N 5/265* (2013.01)

(58) Field of Classification Search
None
See application file for complete search history.

(56) References Cited

U.S. PATENT DOCUMENTS 6,020,931 A 2/2000 Bilbrey et al.
7,577,978 B1 8/2009 Wistendahl et al.
(Continued)

FOREIGN PATENT DOCUMENTS

GB 2 502 986 12/2013
WO WO 2010/141939 12/2010
(Continued)

OTHER PUBLICATIONS

Jokinen, "Spoken Dialogue Systems" (Year: 2009).*

*Primary Examiner* — Eileen M Adams
(74) *Attorney, Agent, or Firm* — Leason Ellis LLP (57) ABSTRACT

Access to a networked communication session is provided to each of a plurality of user computing devices that are each configured with at least a camera, audio input subsystem, and audio output subsystem. During the networked communication session and after an audio input of a first user computing device detects a user speaking, the volume of the audio output subsystem of the first user computing device is adjusted. Further, the volume of the audio input subsystem of each of the other user computing devices is adjusted. Furthermore, after an audio input subsystem of a second user computing device detects a user of the second user computing device speaking, the volume of the audio output subsystem of the second user computing device is adjusted, as is the audio input subsystem of the other respective user computing devices and the audio output subsystem of the first user computing device.

20 Claims, 11 Drawing Sheets

Related U.S. Application Data now Pat. No. 9,852,764, which is a continuation-in-part of application No. 14/813,974, filed on Jul. 30, 2015, now Pat. No. 9,666,231, and a continuation-in-part of application No. 14/316,536, filed on Jun. 26, 2014, now Pat. No. 9,363,448, said application No. 15/608,932 is a continuation-in-part of application No. 15/247,534, filed on Aug. 25, 2016, now Pat. No. 9,787,945, and a continuation-in-part of application No. 14/833,984, filed on Aug. 24, 2015, now Pat. No. 9,661,256, which is a continuation-in-part of application No. 14/316,536, filed on Jun. 26, 2014, now Pat. No. 9,363,448, application No. 16/192,691, which is a continuation-in-part of application No. 16/002,668, filed on Jun. 7, 2018.

(60) Provisional application No. 62/586,850, filed on Nov. 15, 2017, provisional application No. 62/031,114, filed on Jul. 30, 2014, provisional application No. 62/209,727, filed on Aug. 25, 2015, provisional application No. 62/242,029, filed on Oct. 15, 2015, provisional application No. 62/329,081, filed on Apr. 28, 2016, provisional application No. 61/839,757, filed on Jun. 26, 2013, provisional application No. 61/845,743, filed on Jul. 12, 2013.

(56) References Cited

U.S. PATENT DOCUMENTS

| | | |
|---|---|---|
| 8,508,614 B2 | 8/2013 | Segal |
| 8,584,164 B2 | 11/2013 | Walter et al. |
| 8,745,657 B2 | 6/2014 | Chalozin et al. |
| 9,036,043 B2 | 5/2015 | Segal |
| 9,363,448 B2 | 6/2016 | Segal |
| 9,661,256 B2 | 5/2017 | Segal |
| 9,787,945 B2 | 10/2017 | Segal |
| 9,852,764 B2 | 12/2017 | Segal |
| 2001/0006382 A1 | 7/2001 | Sevat |
| 2002/0186233 A1* | 12/2002 | Holtz .............. G06F 3/1431 |
| | | 715/716 |
| 2004/0015398 A1 | 1/2004 | Hayward |
| 2005/0137958 A1 | 6/2005 | Huber et al. |
| 2005/0204438 A1 | 9/2005 | Wang |
| 2006/0075668 A1 | 4/2006 | Sauer |
| 2007/0089134 A1 | 4/2007 | Stearns |
| 2007/0266322 A1 | 11/2007 | Tretter |
| 2008/0033806 A1 | 2/2008 | Howe |
| 2008/0096175 A1* | 4/2008 | du Toit .............. G09B 5/00 |
| | | 434/308 |
| 2008/0109300 A1 | 5/2008 | Bason |
| 2008/0120675 A1 | 5/2008 | Morad et al. |
| 2008/0150913 A1 | 6/2008 | Bell et al. |
| 2009/0066690 A1 | 3/2009 | Harrison |
| 2009/0153804 A1 | 6/2009 | Giraldo et al. |
| 2009/0237565 A1* | 9/2009 | Staker .............. H04N 5/272 |
| | | 348/584 |
| 2010/0083191 A1 | 4/2010 | Marshall |
| 2010/0174783 A1 | 7/2010 | Zarom |
| 2010/0333004 A1 | 12/2010 | Kristiansen |
| 2011/0161990 A1 | 6/2011 | Smith |
| 2011/0202827 A1* | 8/2011 | Freishtat .............. G06Q 30/02 |
| | | 715/234 |
| 2011/0249075 A1 | 10/2011 | Abuan et al. |
| 2011/0254912 A1 | 10/2011 | Mock et al. |
| 2011/0298935 A1 | 12/2011 | Segal |
| 2012/0158524 A1 | 6/2012 | Hintz |
| 2012/0206562 A1 | 8/2012 | Yang |
| 2013/0031593 A1 | 1/2013 | Booth |
| 2013/0073985 A1 | 3/2013 | Hamlin et al. |
| 2013/0117129 A1 | 5/2013 | Brown et al. |
| 2013/0155187 A1 | 6/2013 | Skyberg |
| 2013/0173355 A1 | 7/2013 | Barcenas |
| 2013/0212615 A1 | 8/2013 | Schultz |
| 2014/0002581 A1 | 1/2014 | Bear et al. |
| 2014/0086557 A1 | 3/2014 | Yu et al. |
| 2014/0132702 A1 | 5/2014 | Leibovich et al. |
| 2014/0215542 A1 | 7/2014 | Terpe |
| 2015/0149930 A1 | 5/2015 | Walkin et al. |
| 2016/0098941 A1 | 4/2016 | Kerluke |
| 2017/0133011 A1* | 5/2017 | Chen ................ H04L 12/4625 |
| 2019/0020853 A1 | 1/2019 | Segal |

FOREIGN PATENT DOCUMENTS

| | | |
|---|---|---|
| WO | WO 2012/139082 | 10/2012 |
| WO | WO 2013/076478 | 5/2013 |
| WO | WO 2013/167901 | 11/2013 |

* cited by examiner

AUDIO/VISUAL SYNCHING SYSTEM AND METHOD

CROSS-REFERENCE TO RELATED APPLICATIONS

This application is based on and claims priority to U.S. Patent Application Ser. No. 62/586,850, filed Nov. 15, 2017. Further, this application is a continuation-in-part of U.S. patent application Ser. No. 16/002,668, filed Jun. 7, 2018. Moreover, this application is a continuation-in-part of U.S. patent application Ser. No. 16/181,617, filed Nov. 6, 2018, which is a continuation of U.S. patent application Ser. No. 15/853,377, filed Dec. 22, 2017, now U.S. Pat. No. 10,121,512, issued Nov. 6, 2018, which is a continuation of U.S. patent application Ser. No. 15/608,932, filed May 30, 2017, now U.S. Pat. No. 9,852,764, issued Dec. 26, 2017, which is a continuation-in-part of U.S. patent application Ser. No. 14/813,974, filed Jul. 30, 2015, now U.S. Pat. No. 9,666,231, issued May 30, 2017. U.S. patent application Ser. No. 14/813,974 is based on and claims priority to U.S. Provisional Patent Application Ser. No. 62/031,114, filed on Jul. 30, 2014, and U.S. patent application Ser. No. 14/813,974 is a continuation-in-part of U.S. patent application Ser. No. 14/316,536, filed Jun. 26, 2014, now U.S. Pat. No. 9,363,448, filed Jun. 7, 2016. Further, U.S. patent application Ser. No. 15/608,932 is a continuation-in-part of U.S. patent application Ser. No. 15/247,534, filed Aug. 25, 2016, now U.S. Pat. No. 9,787,945, issued Oct. 10, 2017, which is based on and claims priority to U.S. Provisional Patent Application Ser. No. 62/209,727, filed Aug. 25, 2015, U.S. Provisional Patent Application Ser. No. 62/242,029, filed Oct. 15, 2015, and U.S. Provisional Patent Application Ser. No. 62/329,081, filed Apr. 28, 2016. U.S. application Ser. No. 15/247,534, further, is a continuation-in-part of U.S. application Ser. No. 14/833,984, filed Aug. 24, 2015, now U.S. Pat. No. 9,661,256, issued May 23, 2017, which is a continuation-in-part of U.S. application Ser. No. 14/316,536, filed Jun. 26, 2014, now U.S. Pat. No. 9,363,448, issued Jun. 7, 2016, which is based on and claims priority to U.S. Provisional Patent Application Ser. No. 61/839,757, filed Jun. 26, 2013 and U.S. Provisional Patent Application Ser. No. 61/845,743, filed Jul. 12, 2013, the entire contents of all of which are incorporated by reference as if expressly set forth in their respective entireties herein.

FIELD

The present application relates, generally, to content presentation and, more particularly, to a system and method for providing and interacting with content via one or more interactive communication sessions.

BACKGROUND

Interactive and supplemental content that has been made available to viewers has been done through a decoupled, separate communication channel. For instance, a producer can provide a separate communication channel with data, a video stream, or both at a URL associated with the broadcast. For example, a television station can have on-air programming and also provide supplemental content available through a website. Apart from sponsoring both sources of information, these communication channels are generally decoupled from one another. In other words, the broadcaster has only an indirect relationship to the viewer with regard to any supplemental content.

In interactive videoconferencing sessions, a plurality of participants may interact within a single location, such as a conference room. In such instances, some people may have the speaker of their respective computing devices on while simultaneously speaking into their devices' microphones. This can result in audio disturbances, such as caused by the microphone capturing the audio output of the speaker. Feedback, echo or other interferences can impede audio content of the interactive videoconference, and negatively affect the experience for all participants. This further inhibits the ability for users to collaborate.

BRIEF SUMMARY

In accordance with one or more implementations of the present application, a system and/or method provide respective interactive audio/video content of each of a plurality of computing devices during a networked communication session. At least one processor operatively coupled to non-transitory processor readable media is configured thereby to cause the at least one processor to perform steps, including to define the networked communication session. Further, respective access to the networked communication session is provided to each of a plurality of user computing devices that are each configured with at least a camera, audio input subsystem, and audio output subsystem. A composited interactive audio/video feed is generated that is comprised of video and audio input received during the networked communication session from at least two of the respective user computing devices. The composited audio/video feed is transmitted to each of the respective user computing devices.

Continuing with this one or more implementations, during the networked communication session and after an audio input subsystem of a first user computing device of the plurality of user computing devices detects a user of the first user computing device speaking, the at least one processor executes instructions to adjust volume of the audio output subsystem of the first user computing device. Further, the volume of the audio input subsystem of each of the other respective ones of the plurality of user computing devices is adjusted. Furthermore, during the networked communication session and after an audio input subsystem of a second user computing device of the plurality of user computing devices detects a user of the second user computing device speaking, the volume of the audio output subsystem of the second user computing device is adjusted, as is the audio input subsystem of each of the other respective ones of the plurality of user computing devices and the audio output subsystem of the first user computing device.

It is with respect to these and other considerations that the disclosure made herein is presented.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION

By way of introduction and overview, in one or more implementations the present application provides systems and methods for providing and improving interactive video conferencing over one or more data communication networks, such as the Internet. Devices operating, for example, iOS, ANDROID, WINDOWS MOBILE, BLACKBERRY, MAC OS, WINDOWS or other operating systems are configured with one or more software applications that provide functionality, such as with an interface for developing ("authoring") distributable coordinated presentations. Moreover, such devices can be configured with one or more software applications that provide interactive video conferencing functionality. Using a respective interface, which can be a simple browser-based application, users may interact with each other and share interactive videos and other content as a function of touch and gestures, as well as graphical screen controls that, when selected, cause a computing device to execute one or more instructions and effect various functionality.

Distributable coordinated presentations in accordance with the present application can include interactive video having customizable and interactive functionality for and between devices with a plurality of end-users who receive the video. Further, the one or more software applications configure a user computing device with a viewing/interactive tool, referred to herein, generally, as a "consuming" interface for end-users who receive interactive video that are authored in accordance with the present application and usable for end-users to communicate (e.g., via interactive video conferencing functionality). Users may interact with each other and share interactive videos and other content as a function of touch and gestures, as well as graphical screen controls that, when selected, cause a computing device to execute one or more instructions and effect various functionality. For example, a smartphone or other mobile computing device can be configured via one or more applications in accordance with the ability to simulate a laser pointer, drawing tool, mouse, trackball, keyboard or other input device.

In accordance with the teachings herein, implementations of the present application provide a simple to use, informing and entertaining communications experience that incorporates content from a plurality of computing devices, e.g., smartphones, tablets, laptops and desktops, and enable live sharing in a real-time and conferencing capability therefore. In one or more implementations, various kinds of display devices, such as televisions, can be used for respective audio/visual display. Such devices can provide feed from cameras and/or microphones configured with various local and/or remotely located computing devices that are communicating over data communication networks such as the Internet. Display using a television can be implemented in the present application in various ways, such as via an Internet media extender provided by APPLE TV, ROKU, AMAZON FIRE TV or GOOGLE CHROMECAST. As used herein, an Internet media extender refers, generally, to a category of devices that provide for content to be streamed to a monitor and/or television, surround sound devices, and the like. Unlike functionality provided by known Internet media extenders, however, the present application facilitates integrating audio/video input capabilities of computing devices (e.g., microphones, cameras and software that drive and enhance audio/visual captures) into video-conferencing capabilities. The present application facilitates one or more of: one-to-one (1:1) video conferencing; group video conferencing; sharing and/or viewing of content provided on a plurality of computing devices, and interactive computing activities.

In one or more implementations, content, which can be formatted as and/or include images, audio/video content, website content, computer programs and/or other content provided in various formats (collectively referred to herein, generally, as "vApps"), can be implemented vis-à-vis one or more mobile software applications. vApp icons can be provided that represent respective vApps that are included with the conferencing sessions. In accordance with one or more implementations, after a respective icon is selected by a user, the user can interact with the vApp represented by that icon. Functionality, information and/or content can be associated with the vApp and provided in a shared conferencing session, which is made available to user computing devices connected thereto.

Thus, in one or more implementations, the present application provides for interactive video conferencing that integrates audio/video input and output from individual mobile computing devices (e.g., smartphones and tablet computers) with Internet media extender devices (e.g., APPLE TV). By leveraging technology configured with mobile computing devices, e.g., cameras and microphones, the present application provides a new form of live and interactive functionality that can make a person's living room or other residential viewing area into a high-end video conferencing suite. Non-residential implementations are supported, as well, as shown and described in greater detail herein.

Accordingly, the present application provides online collaborative services, for example, including for webinars, webcasts, and meetings. In one or more implementations, Internet technologies such as TCP/IP connectivity support web conferencing services, including sharing of audio, video, textual and various forms of multi-media content.

Figure 1:
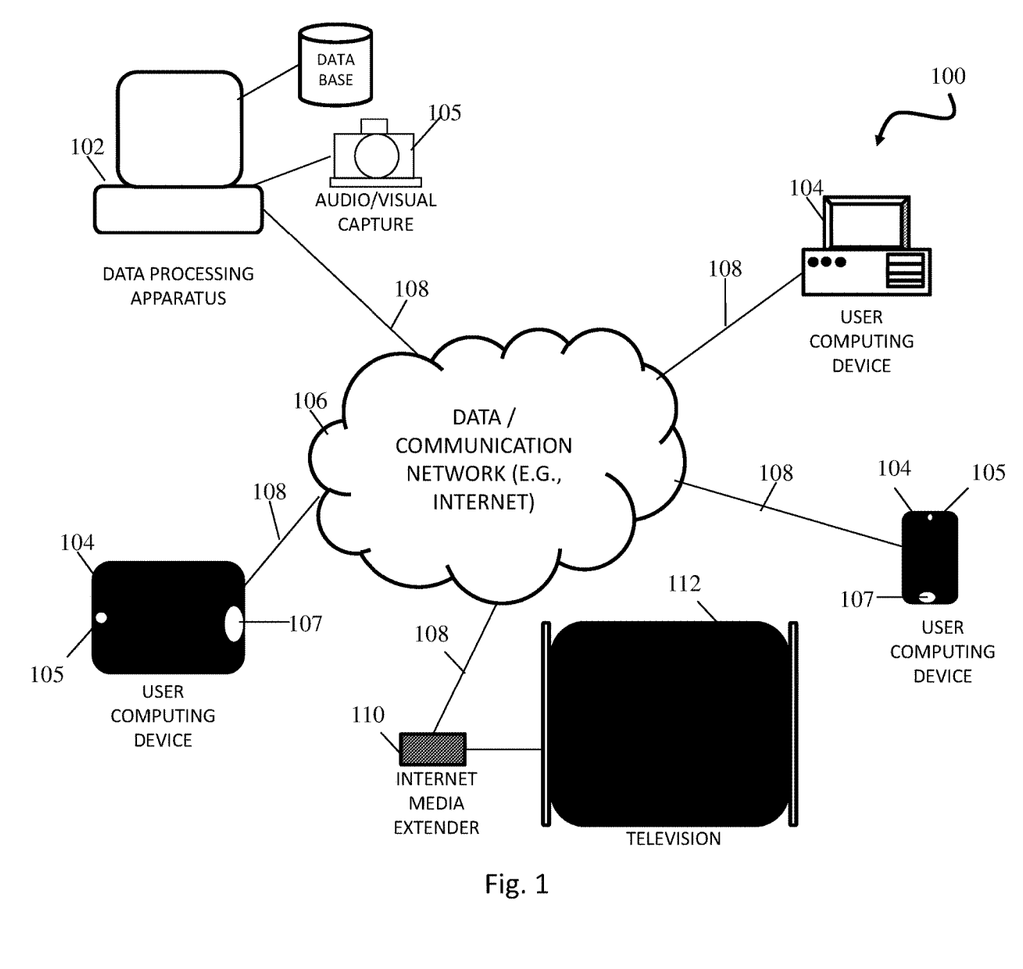
FIG. 1 is a diagram illustrating an example hardware arrangement that operates for providing the systems and methods disclosed herein.

Referring to FIG. 1, a diagram is provided that shows an example hardware arrangement that operates for providing the systems and methods disclosed herein, and designated generally as system 100. System 100 can include one or more data processing apparatuses 102 that are at least communicatively coupled to one or more user computing devices 104 across communication network 106. Data processing apparatuses 102 and user computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations being executed at a particular time. In addition, an audio/visual capture device 105 is depicted in FIG. 1, which can be configured with one or more cameras (e.g., front-facing and rear-facing cameras), a microphone, a microprocessor, and a communications module(s) and that is coupled to data processing apparatus 102. The audio/visual capture device 105 can be configured to interface with one or more data processing apparatuses 102 for producing high quality and interactive multimedia content, and supporting interactive video conferencing.

With continued reference to FIG. 1, data processing apparatus 102 can be configured to access one or more databases for the present application, including image files, video content, documents, audio/video recordings, metadata and other information. However, it is contemplated that data processing apparatus 102 can access any required databases via communication network 106 or any other communication network to which data processing apparatus 102 has access. Data processing apparatus 102 can communicate with devices comprising databases using any known communication method, including a direct serial, parallel, universal serial bus ("USB") interface, or via a local or wide area network.

User computing devices 104 can communicate with data processing apparatuses 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other means, to provide received data on display devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatuses 102. In addition, system 100 can include Internet media extender 110 that is communicatively coupled to television 112, such as via a high-definition multimedia interface ("HDMI") or other connection.

System 100 preferably includes software that provides functionality described in greater detail herein, and preferably resides on one or more data processing apparatuses 102 and/or user computing devices 104. One of the functions performed by data processing apparatus 102 is that of operating as a web server and/or a web site host. Data processing apparatuses 102 typically communicate with communication network 106 across a permanent i.e., unswitched data connection 108. Permanent connectivity ensures that access to data processing apparatuses 102 is always available.

Figure 2:
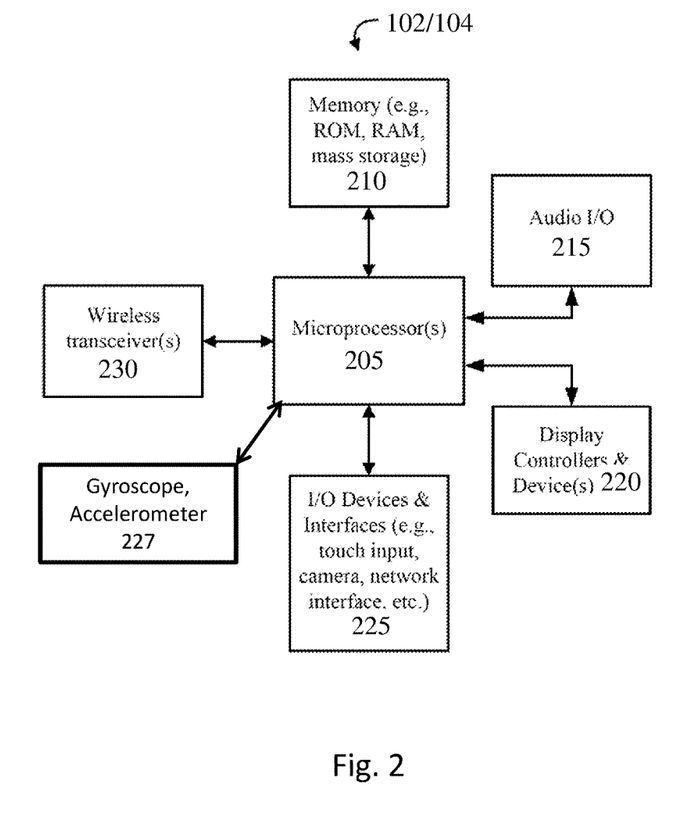
FIG. 2 is a block diagram that illustrates functional elements of a computing device in accordance with an embodiment.

FIG. 2 illustrates, in block diagram form, an exemplary data processing apparatus 102 and/or user computing device 104 that can provide various functionality, as shown and described herein. Although not expressly indicated, one or more features shown and described with reference with FIG. 2 can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type. The data processing apparatus 102 and/or user computing device 104 also includes an audio input/output subsystem 215 which may include one or more microphones and/or speakers.

A display controller and display device 220 provides a visual user interface for the user; this user interface may include a graphical user interface which, for example, is similar to that shown on a Macintosh computer when running Mac OS operating system software or an iPad, iPhone, or similar device when running iOS operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network.

It will be appreciated that one or more buses, may be used to interconnect the various modules in the block diagram shown in FIG. 2.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire, etc. to connect the system 100 with another device, external component, or a network. Moreover, the I/O devices and interfaces can include gyroscope and/or accelerometer 227, which can be configured to detect 3-axis angular acceleration around the X, Y and Z axes, enabling precise calculation, for example, of yaw, pitch, and roll. The gyroscope and/or accelerometer 227 can be configured as a sensor that detects acceleration, shake, vibration shock, or fall of a device 102/104, for example, by detecting linear acceleration along one of three axes (X, Y and Z). The gyroscope can work in conjunction with the accelerometer, to provide detailed and precise information about the device's axial movement in space. More particularly, the 3 axes of the gyroscope combined with the 3 axes of the accelerometer enable the device to recognize approximately how far, fast, and in which direction it has moved to generate telemetry information associated therewith, and that is processed to generate coordinated presentations, such as shown and described herein.

Additional components, not shown, can also be part of the data processing apparatus 102 and/or user computing device 104, and, in certain embodiments, fewer components than that shown in FIG. 2 may also be used in data processing apparatus 102 and/or user computing device 104. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 102 and/or user computing device 104.

In one or more implementations, the present application provides improved processing techniques to prevent packet loss, to improve handling interruptions in communications, to reduce or eliminate latency and other issues associated with wireless technology. For example, in one or more implementations Real Time Streaming Protocol (RTSP) can be implemented, for example, for sharing output associated with a camera, microphone and/or other output devices configured with a computing device. RTSP is an effective (though not necessary in all implementations) network control protocol for entertainment and communications systems, including in connection with streaming output. RTSP is used in the present application, at least in part, for establishing and controlling media sessions between various end points, including user computing devise 104, Internet media extender 110 and data processing apparatus 102.

In addition to RTSP, one or more implementations of the present application can be configured to use Web Real-Time Communication ("WebRTC") to support browser-to-browser applications, including in connection with voice, video chat, and peer-to-peer ("P2P") file sharing. Thus, the present application avoids a need for either internal or external plugins to connect endpoints, including for voice/video or other communication sharing. In one or more implementations, the present application implements WebRTC for applications and/or Internet web sites to capture and/or stream audio and/or video media, as well as to exchange data between browsers without requiring an intermediary. The set of standards that comprises WebRTC makes it possible to share data and perform teleconferencing peer-to-peer, without requiring that the user install plug-ins or any other third-party software. WebRTC includes several interrelated APIs and protocols which work together.

In one or more implementations, at least one of the Internet media extender components 110 includes APPLE TV. After an Internet media extender 110 is installed (e.g., connected to a television set and connected to a Wi-Fi, Ethernet or other local area network), a software application is installed on the Internet media extender 110, as well as at least one mobile computing device 104. For example, a user downloads and installs an app to an Internet media extender 110 ("TV APP") and also installs an app to a user computing device 104 ("MOBILE APP"). Once installed, and the first time the TV APP is executed, the user is prompted to launch the MOBILE APP. Thereafter, the mobile computing device 104 (e.g., an iPhone) is automatically detected by the TV APP. During subsequent uses, video content that is provided as a function audio/video output from the computing device (e.g., iPhone) is provided instantly on the television that is connected to the Internet media extender 110. In operation, audio/video feed from the iPhone is provided on big screen. The TV APP and the MOBILE APP may be configured as a single application (e.g., distributed as a single application), or may be provided as separate applications.

Figure 2A:
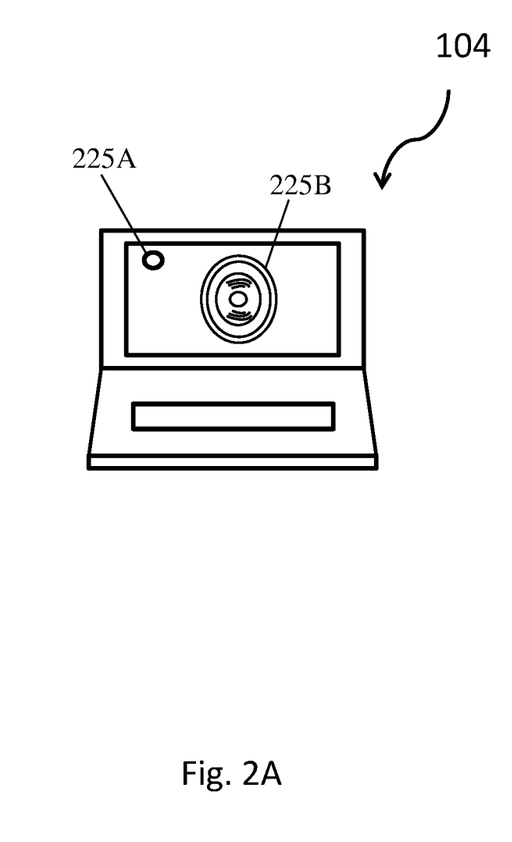
FIGS. 2A and 2B represent example computing devices configured with a camera and microphone, and associated operational aspects thereof.

In one or more implementations, each of a plurality of participants operating, for example, user computing device 104 participate in an interactive video conference at least in part by establishing a data/communication session with the data processing apparatus 102. A form of a star topology is established, in which data processing apparatus 102 is communicatively connected to each of a plurality of respective user computing devices 104 and respectfully receives audio/video feed from each device, such as provided as a function of input from a respective camera 225A and/or microphone 22B (FIG. 2A).

In one or more implementations of the present application, wireless connectivity, such as BLUETOOTH low energy ("BLE"), is configured vis-à-vis the user computing devices 104 such as to implement a mesh network within a location, such as a conference room. In one or more implementations, an identifier ("ID") representing a respective session, computing device and/or other suitable information is transmitted to and from devices within the location. Other information that is determined and can be transmitted includes a respective level of volume that is being received by a respective microphone 225A. For example, a microphone 225A of a computing device 104 operated by one person who is not speaking receives low volume, while a microphone 225A of a computing device 104 operated by a person who is speaking receives higher volume. The information representing the respective input levels is processed, for example, by a single computing device 102 or 104, or by a plurality of devices, e.g., 102 and/or 104, to cause a microphone 225A and or speaker 225B to be adjusted (e.g., muted, turned up or down) substantially in real time. Using data representing input levels, the software operating on one or more user computing devices 104 can cause the device to mute the microphone when a person is not speaking, and while audio output is coming from the speaker 225B. This would occur, for example, when a person operating a respective user computing device 104 is simply listening to someone speaking. The respective computing device 104 of the person speaking, for example, referred to herein generally as the "active" device, can be configured to operate in the opposite way—such that the speaker 225B is adjusted, such as to be turned down or off, while the active device's microphone 225A is not muted.

Figure 2B:
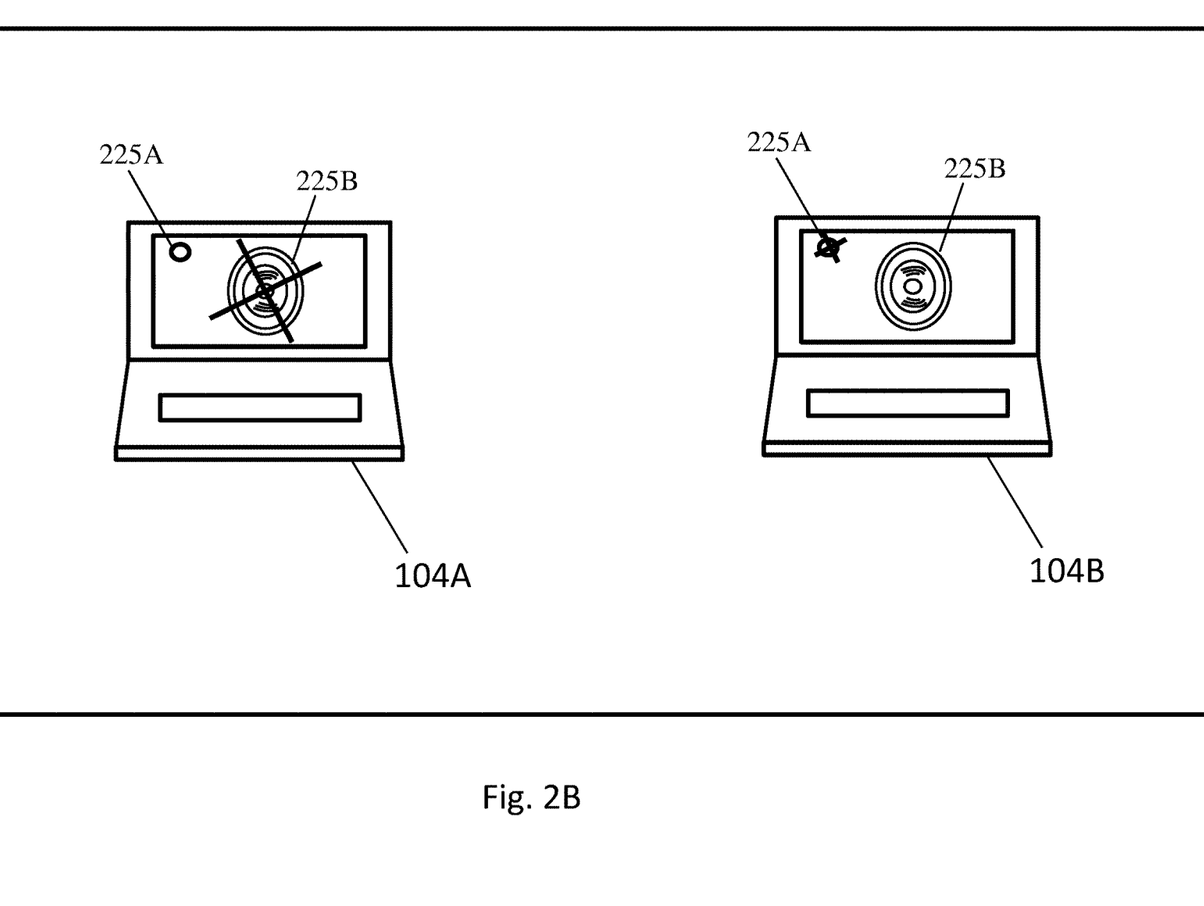

FIG. 2B illustrates an example active user computing device 104A, in which the microphone 225A is enabled and the speaker 225B is turned down (illustrated with an X through the speaker 225B). User computing device 104B illustrated in FIG. 2B illustrates a user computing device 104B that is not active, in which the microphone 225A is disabled ((illustrated with an X through the microphone 225A), and the speaker 225B is operating (e.g., turned up).

Figure 3:
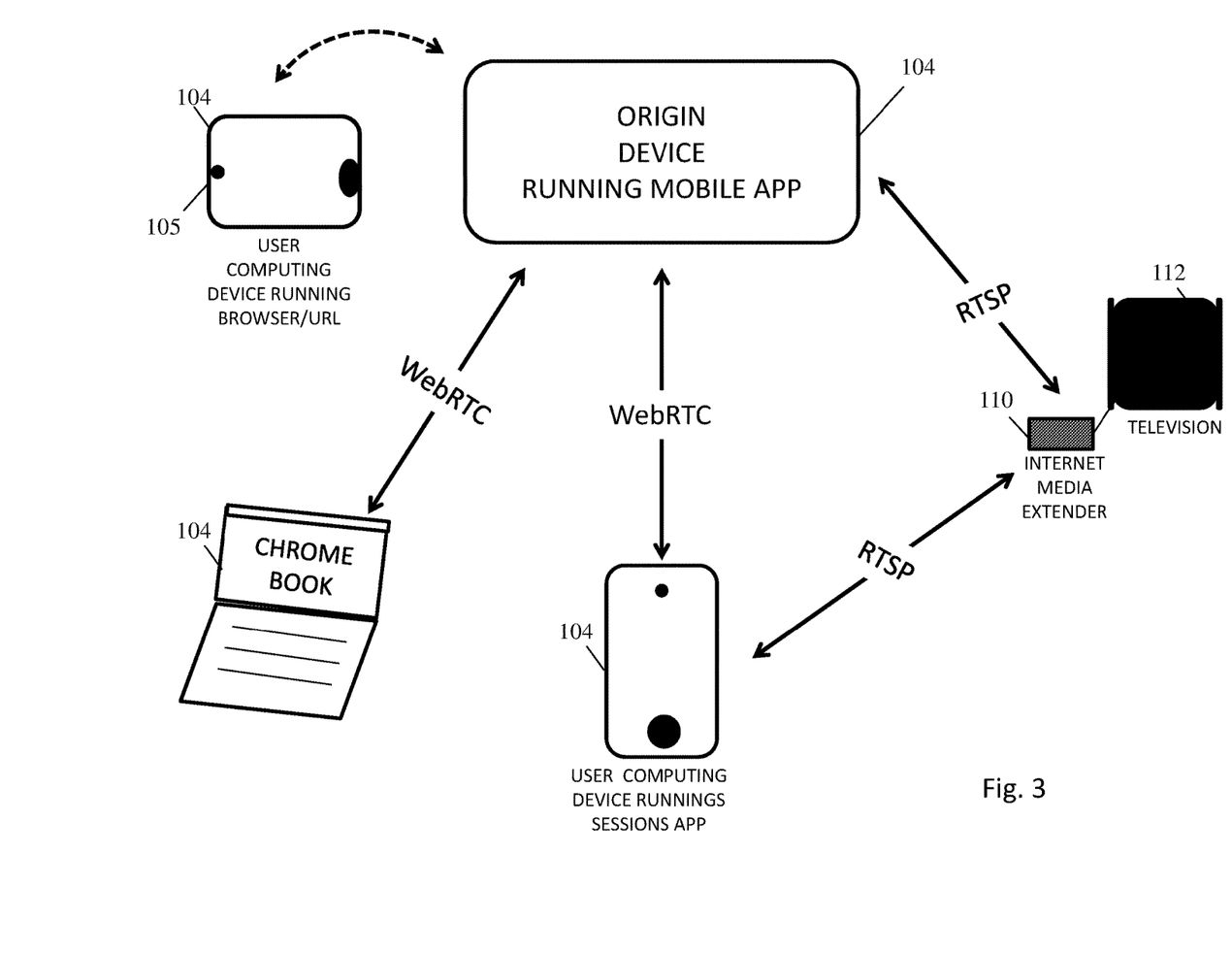
FIG. 3 is an example high-level diagram that illustrates interactivity between various ones of the devices illustrated in FIG. 1.

FIG. 3 is an example high-level diagram that illustrates interactivity between various ones of the devices illustrated in FIG. 1, and identifies example communication protocols in one or more implementations of the present application. The implementation illustrated in FIG. 3 is usable as a consumer (e.g., a residential) implementation, as well as an enterprise implementation. As illustrated in FIG. 3, WebRTC is shown with regard to communications between user computing devices 104 (shown as a CHROME BOOK and mobile computing device, e.g., a smart phone) and supporting browser-to-browser applications and P2P functionality. In addition, RTSP is utilized in connection with user computing devices 104 and Internet media extender 110, thereby enabling presentation of audio/video content from devices 104 on television 112.

Figure 4A:
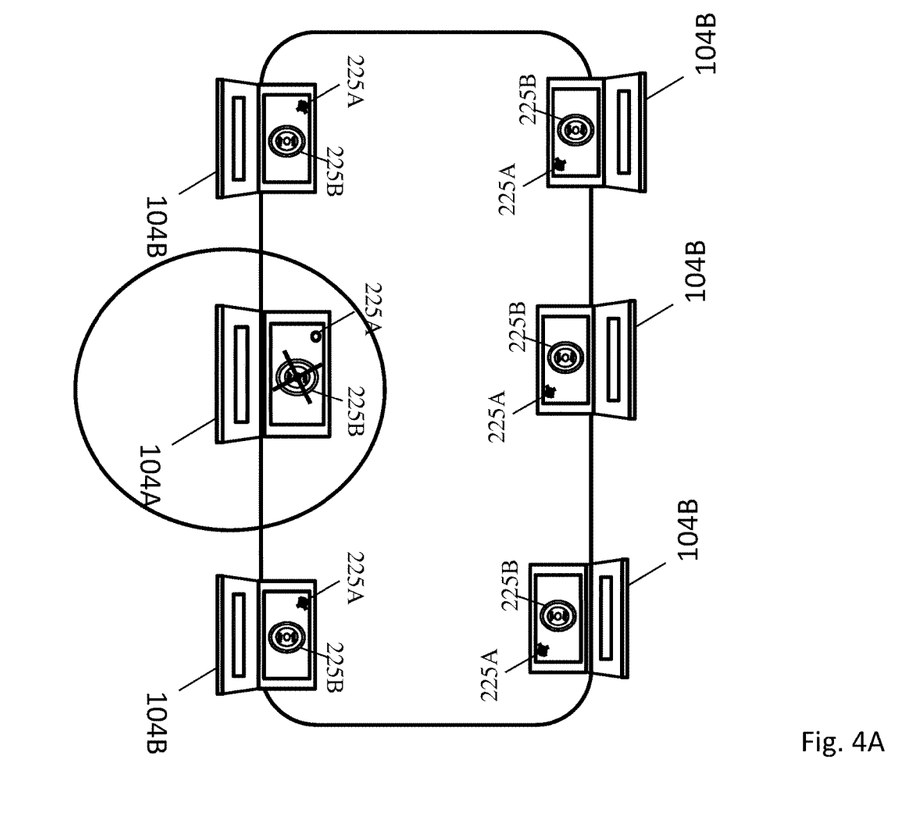
FIGS. 4A and 4B illustrate operational aspects of computing devices configured in accordance with an example implementation of the present application.
Figure 4B:
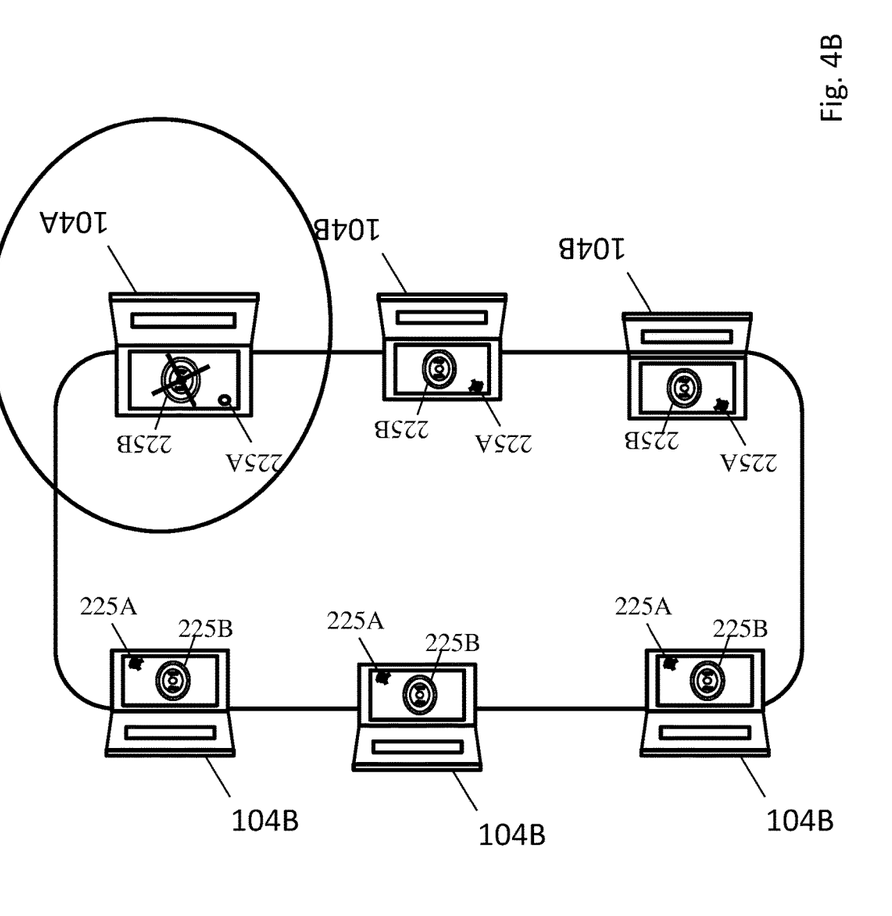

FIGS. 4A and 4B illustrate operational aspects of computing devices configured in accordance with an example implementation of the present application. As shown in FIG. 4A, a plurality of computing devices 104 (104A and 104B) are positioned around a conference room during an interactive video-conferencing session. A single user computing device 104A is the active device, and is shown circled. As the user of the respective active device speaks, the speaker 225B is adjusted to be low or off, while the microphone 225A remains unmuted. The remaining devices 104B operate in the opposite way—with the respective microphones 225A muted and the respective speakers 225B operating (e.g., adjusted suitably for listening). In FIG. 4B, the same interactive videoconferencing session is shown with a different user computing device 104A as the active device (again, shown as circled). The ability for devices to switch between being active or not can be implemented in various ways. For example, a rule set can be enforced in which a minimum amount of time (e.g., 1 second) of silence must exist for the active device 104A to operate as non-active device 104B. Alternatively, when a second user begins to speak during the session, that user's computing device may become the active device 104A, thereby causing the previous active device 104A to become non-active 104B. By controlling microphones 225A and speakers 225B of the respective devices 104, the present application eliminates echo, feedback, or other audio disturbances and provides an improved audio experience. Various timing requirements, conditions or other rules sets can be defined and implemented in accordance with one or more implementations of the present application.

In addition to adjusting the input levels of microphones 225A and output levels of speakers 225B, the present application includes technology for synching audio content, including as a function of one or more BLE signals. For example, audio content can be delayed and synched for input/output on the user computing devices 104 and which alleviates audio disturbances, such as echo and/or feedback. In one or more implementations, an additional data layer can be generated and provided with (e.g., "on top of") an audio/video signal. For example, a signal can be embedded into an audio signal such that the user computing device 104 can interpret and use the signal to control operations of audio input/output. For example, a virtual form of watermarking audio content can be provided for every 10 frames of audio/video content, that can be read digitally to facilitate synchronizing output. For example, a watermark can be provided every second that escalates by a factor of 30 or so for every second, such that the respective frames of audio/video content being interpreted (e.g., read) at the respective devices 104 can be determined.

Figure 5A:
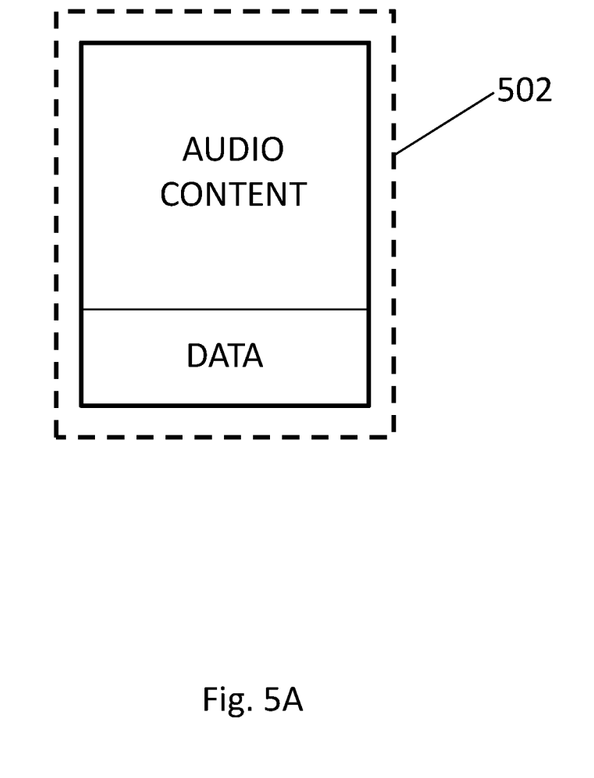
FIGS. 5A-5D illustrate example generation, configuration and utilization of audio components in connection with an interactive video conferencing session, in accordance with the present application.
Figure 5B:
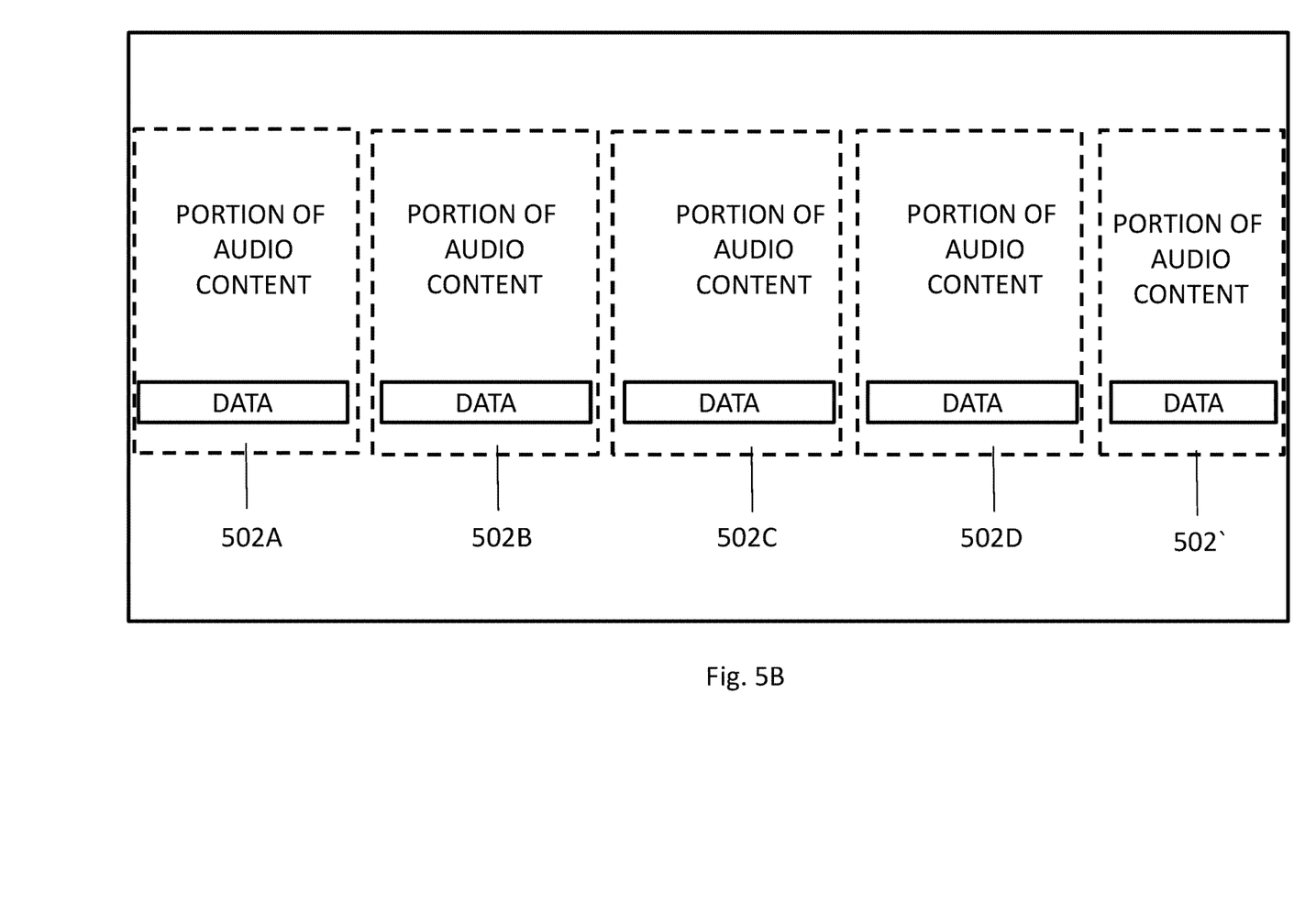

FIGS. 5A-5D illustrate example generation, configuration and utilization of audio (e.g., portions with frames) in connection with an interactive video conferencing session, in accordance with one or more implementations of the present application. FIG. 5A, for example, illustrates example audio content 502 that is configured with data (e.g., a form of watermarking). FIG. 5B illustrates portions of audio content 502A, 502B, 502C, 502D . . . 502' that can be provided with, for example, video frames, and that collectively can represent audio content 502. Each portion can be provided with respective data (e.g., respective watermarks), which is usable by one or more computing devices 104 to identify the respective frames. During playback, for example, a time delay can be implemented to prevent audio content 502 from being output on a respective speaker 225B substantially at the same time as the audio content is captured via a respective microphone 225A.

Figure 5C:
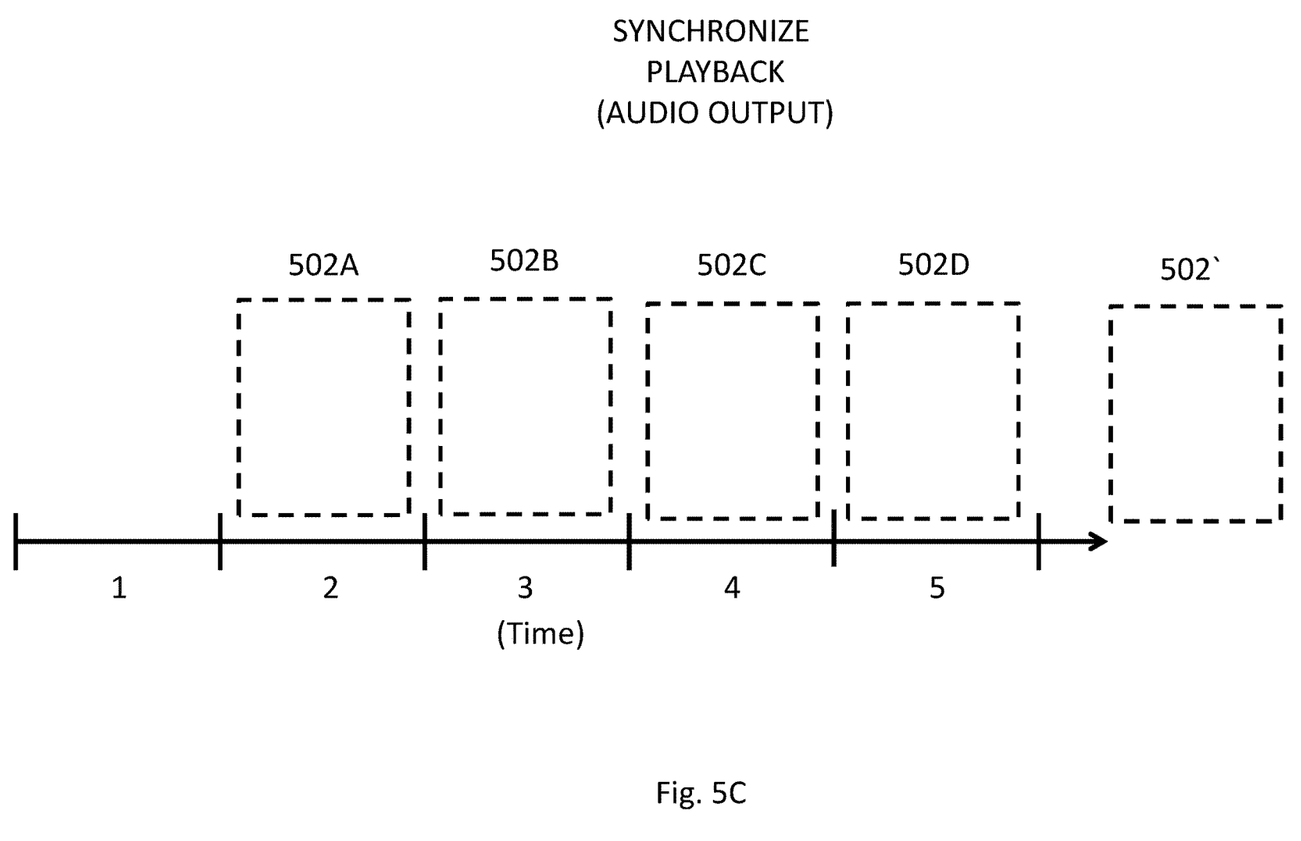

FIG. 5C illustrates an example time sequence in which no audio content is output during a first portion of time and, thereafter, audio content is output to a respective speaker 225B. For example, a user of a respective device 104 during an interactive video conferencing session begins to speak and the respective microphone 225A captures the content. By implementing a delay in the output of the respective speaker 225B by a predefined amount, such as 1 second or more, the user's microphone will not receive the output of the user's respective speaker 225 while the user speaking. Echo or feedback can, thereby, be reduced or eliminated. Moreover, and as described above, the output level of the speaker 225B of the respective device of the user who is speaking can be adjusted to be increased or decreased to further reduce or eliminate audio disturbance.

Figure 5D:
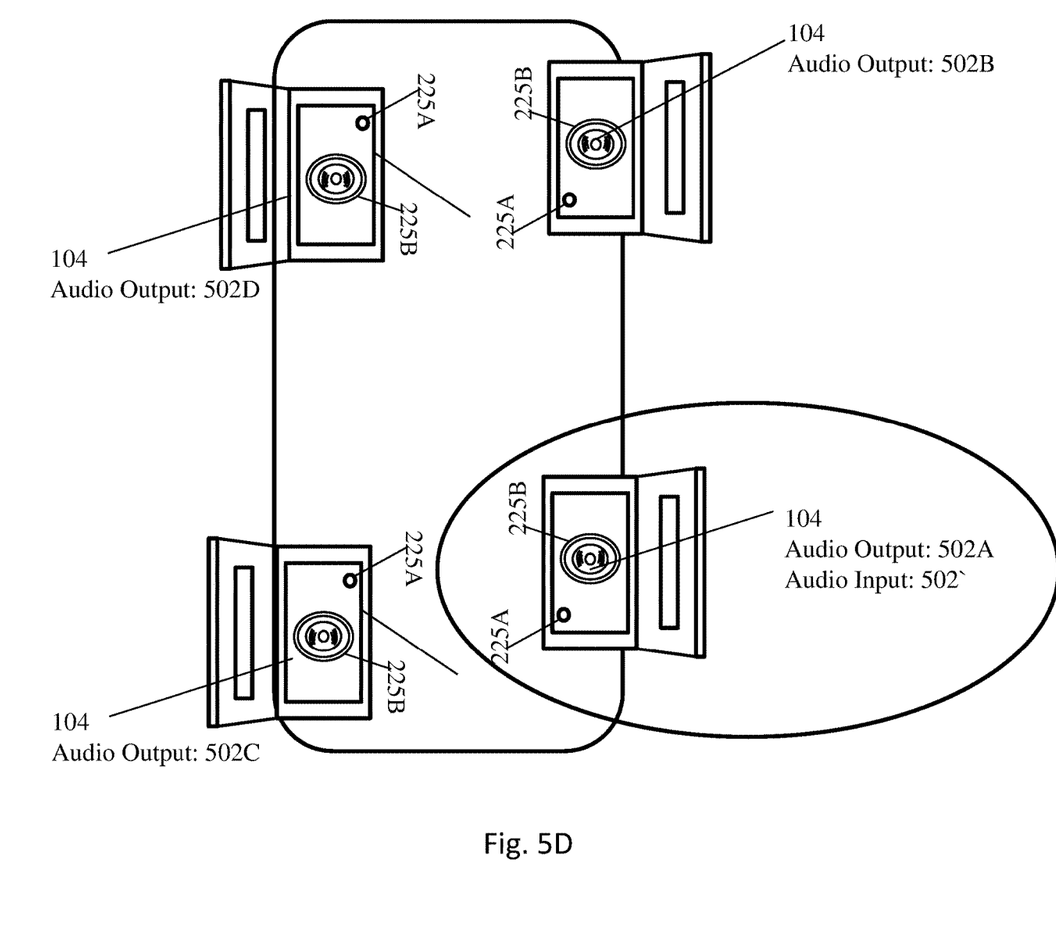

FIG. 5D illustrates a plurality of computing devices 104 that are positioned around a conference room during an interactive video-conferencing session. A single user computing device 104 is the active device, and is shown circled. As the user of the respective active device speaks, the audio content captured by the microphone 225A is output to the respective speaker 225B in a delayed fashion. In the example illustrated in FIG. 5D, the audio input content portion (e.g., what the user is saying at that time) may be 502', while the audio output of the speaker 225B is only at 502A. Moreover, as a function of the BLE signals and/or other data captured by the respective devices 104 during the session, the particular frames being played by each respective device 104 is known. For example, one device 104 is at 502D, another at 502B and another at 502C. This can occur, for example, as a function of differences in bandwidth, processor performance and/or implemented time delays as a function of operational configurations.

Thus as shown and described herein, audio disturbances, such as feedback, echo, cross-talk or other disturbances are significantly reduced or eliminated as a function of controlling audio input/output levels substantially in real-time. In addition or in the alternative, such audio disturbances can be controlled as a function of embedding or including data with audio content, such as via a form of audio watermarks.

Although many of the examples shown and described herein regard distribution of coordinated presentations to a plurality of users, the invention is not so limited. Although illustrated embodiments of the present invention have been shown and described, it should be understood that various changes, substitutions, and alterations can be made by one of ordinary skill in the art without departing from the scope of the present application.

What is claimed is:

1. A system for providing respective interactive audio/video content of each of a plurality of computing devices during a networked communication session, the system comprising:
   non-transitory processor readable media;
   at least one processor operatively coupled to the non-transitory processor readable media, wherein the non-transitory processor readable media have instructions that, when executed by the at least one processor, causes the at least one processor to perform the following steps:
   define the networked communication session;
   provide respective access to the networked communication session to each of a plurality of user computing devices that are each configured with at least a camera, an audio input subsystem, and an audio output subsystem;
   generate a composited interactive audio/video feed comprised of video and audio input received during the networked communication session from at least two of the respective user computing devices;
   transmit to each of the plurality of user computing devices the composited audio/video feed,
   a) wherein, during the networked communication session and after an audio input subsystem of a first user computing device of the plurality of user computing devices detects a user of the first user computing device speaking, the at least one processor executes instructions to:
      i) adjust volume of the audio output subsystem of the first user computing device; and
      ii) adjust volume of the audio input subsystem of each of the other respective ones of the plurality of user computing devices; and
   b) wherein, during the networked communication session and after an audio input subsystem of a second user computing device of the plurality of user computing devices detects a user of the second user computing device speaking, the at least one processor executes instructions to:
      i) adjust volume of the audio output subsystem of the second user computing device;
      ii) adjust volume of the audio input subsystem of each of the other respective ones of the plurality of user computing devices; and
      iii) adjust volume of the audio output subsystem of the first user computing device.

2. The system of claim 1, wherein the non-transitory processor readable media have instructions that, when executed by the at least one processor, causes the at least one processor to delay steps b) i), b) ii), and b) iii) until after a predetermined amount of time during which none of the plurality of user computing devices detects any user speaking.

3. The system of claim 1,
   wherein, during the networked communication session and after the audio input subsystem of the first user computing device of the plurality of user computing devices detects the user of the first user computing device speaking, an instruction executes to:
      designate the first user computing device an active device; and
      designate each of the other user computing devices of the plurality of computing devices non-active devices; and
   wherein, during the networked communication session and after the audio input subsystem of the second user computing device of the plurality of user computing devices detects the user of the second user computing device speaking, an instruction executes to:
      designate the second user computing device the active device; and
      designate the first user computing device a non-active device among the plurality of other non-active devices.

4. The system of claim 1, wherein the adjustment in steps a) i), a) ii), b) i), and b) ii) is to decrease volume or to mute volume.

5. The system of claim 1, wherein the adjustment in step b) iii) is to increase volume.

6. The system of claim 1, wherein the non-transitory processor readable media have instructions that, when executed by the at least one processor, causes the at least one processor to:
   synchronize audio content and video content, including by delaying providing at least one of the audio content and video content to at least one of the user computing devices.

7. The system of claim 6, wherein the delaying occurs as a function of at least one BLUETOOTH signal.

8. The system of claim 6, wherein the synchronizing and/or delaying occurs as a function of at least data received in audio.

9. The system of claim 8, wherein the data is usable by the at least one processor and/or at least one of the plurality of user computing devices for a time delay that prevents output of audio and input of audio occurring simultaneously on one of the plurality of user computing devices.

10. The system of claim 6, wherein the synchronizing occurs as a function of differences in available bandwidth between the respective user computing devices.

11. A method for providing respective interactive audio/video content of each of a plurality of computing devices during a networked communication session, the system comprising:
   defining, by at least one processor configured by executing instructions on non-transitory processor readable media, the networked communication session;
   providing, by the at least one processor, respective access to the networked communication session to each of a plurality of user computing devices that are each configured with at least a camera, audio input subsystem, and audio output subsystem;
   generating, by the at least one processor, a composited interactive audio/video feed comprised of video and audio input received during the networked communication session from at least two of the respective user computing devices;
   transmitting, by the at least one processor to each of the plurality of user computing devices the composited audio/video feed,
   a) wherein, during the networked communication session and after an audio input subsystem of a first user computing device of the plurality of user computing devices detects a user of the first user computing device speaking:
      i) adjusting, by the at least one processor, volume of the audio output subsystem of the first user computing device; and ii) adjusting, by the at least one processor, volume of the audio input subsystem of each of the other respective ones of the plurality of user computing devices; and b) wherein, during the networked communication session and after an audio input subsystem of a second user computing device of the plurality of user computing devices detects a user of the second user computing device speaking:

i) adjusting, by the at least one processor, volume of the audio output subsystem of the second user computing device;

ii) adjusting, by the at least one processor, volume of the audio input subsystem of each of the other respective ones of the plurality of user computing devices; and iii) adjusting, by the at least one processor, volume of the audio output subsystem of the first user computing device.

12. The method of claim 11, further comprising:
delaying, by the at least one processor, steps b) i), b) ii), and b) iii) until after a predetermined amount of time during which none of the plurality of user computing devices detects any user speaking.

13. The method of claim 11, further comprising:
during the networked communication session and after the audio input subsystem of the first user computing device of the plurality of user computing devices detects the user of the first user computing device speaking:
designating, by the at least one processor, the first user computing device an active device; and
designating, by the at least one processor, each of the other user computing devices of the plurality of computing devices non-active devices; and during the networked communication session and after the audio input subsystem of the second user computing device of the plurality of user computing devices detects the user of the second user computing device speaking:
designating, by the at least one processor, the second user computing device the active device; and
designating, by the at least one processor, the first user computing device a non-active device among the plurality of other non-active devices.

14. The method of claim 11, wherein the adjustment in steps a) i), a) ii), b) i), and b) ii) is to decrease volume or to mute volume.

15. The method of claim 11, wherein the adjustment in step b) iii) is to increase volume.

16. The method of claim 11, further comprising:
synchronizing, by the at least one processor, audio content and video content, including by delaying providing at least one of the audio content and video content to at least one of the user computing devices.

17. The method of claim 16, wherein the delaying occurs as a function of at least one BLUETOOTH signal.

18. The method of claim 16, wherein the synchronizing and/or delaying occurs as a function of at least data received in audio.

19. The method of claim 18, wherein the data is usable by the at least one processor and/or at least one of the plurality of user computing devices for a time delay that prevents output of audio and input of audio occurring simultaneously on one of the plurality of user computing devices.

20. The method of claim 16, wherein the synchronizing occurs as a function of differences in available bandwidth between the respective user computing devices.

* * * * *